(No Model.)
J. F. DIXON.
VEHICLE AXLE.
No. 381,829. Patented Apr. 24, 1888.
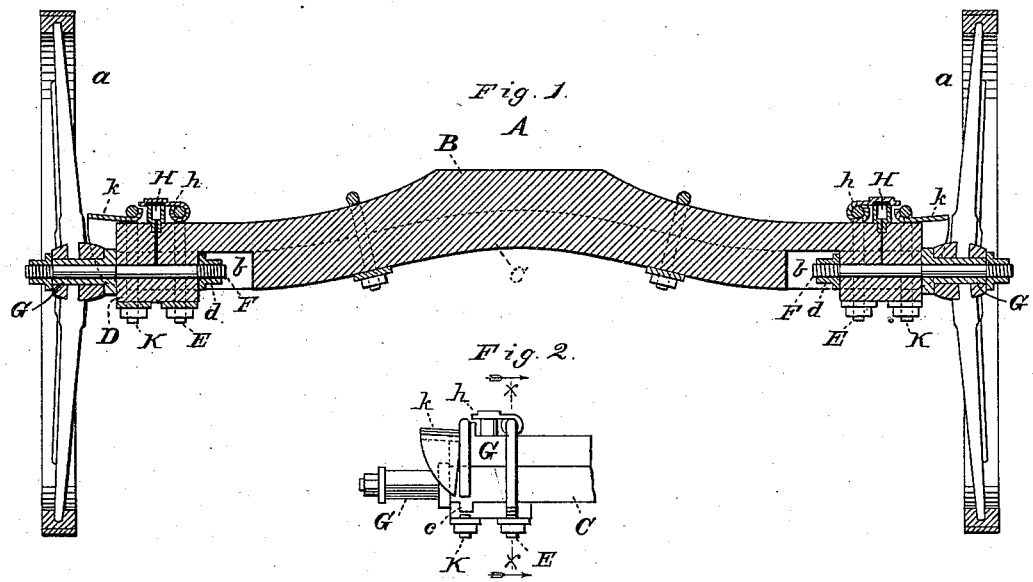
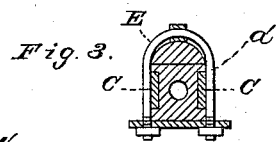
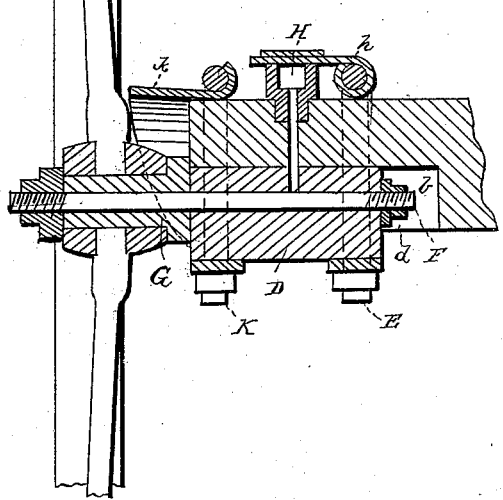
WITNESSES,
Villette Anderson.
C. R. Ferguson.
INVENTOR.
John F. Dixon,
by E. W. Anderson,
Attorney.

UNITED STATES PATENT OFFICE.

JOHN F. DIXON, OF CLAY CENTRE, KANSAS.

VEHICLE-AXLE.

SPECIFICATION forming part of Letters Patent No. 381,829, dated April 24, 1888.

Application filed October 13, 1887. Serial No. 252,234. (No model.)

*To all whom it may concern:*

Be it known that I, JOHN F. DIXON, a citizen of the United States, and a resident of Clay Centre, in the county of Clay and State of Kansas, have invented certain new and useful Improvements in Self-Oiling Spindles; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a vertical section of an axle with its wheels and other fixtures. Fig. 2 is a detail, and shows a side view. Fig. 3 is also a detail, and is a cross-section. Fig. 4 is a detail sectional view of the journal-box.

The invention relates to improvements in self-oiling spindles for vehicle-axles; and it consists in the construction and novel combination of parts hereinafter set forth, and illustrated in the accompanying drawings.

Referring to the drawings by letter, A designates an axle of a vehicle, carrying the wheels *a a*, as shown. The axle A is composed of a central wooden portion, B, and two metallic side strips, C C, which run from end to end in recesses along the sides of the wooden portion B, adjacent to the lower edge thereof. At the ends of the axle the wooden portion is cut away between the strips C, forming recesses *b b* therebetween for the reception of the journal-boxes D of the wheel-spindles. The outer ends of the metal strips C are seated in grooves *a'* on the sides of the journal-boxes, and are provided on their lower edges, near their ends, with the lugs *c*, which enter corresponding recesses extending from the grooves in the journal-boxes D and prevent the latter from slipping longitudinally to the axle.

E E are clips which bind the wooden portion and metal strips of the axle together, and are situated adjacent to the inner ends of the recesses *b*.

F is the wheel-spindle at one end of the axle, having an inner cylindrical portion, which passes through and turns in the corresponding longitudinal bore of the adjacent journal-box D, and is tapped on its end and engaged by a nut, *d*, that prevents the spindles from being drawn out of the box. The outer portion of the spindle is squared or made angular in cross-section and fitted in the corresponding opening in the boxing G, which is also angular or square in cross-section, and is fitted into the hub of the adjoining wheel *a*. The spindle extends outward beyond the boxing G, and is tapped on its outer end and engaged by a suitable nut to prevent the wheel from being displaced. Each journal-box D has an oil-cup, H, made in its top, with a discharge-orifice opening into the top of the bore of the box and immediately above the cylindrical portion of the spindle when in place. The clip E surrounds the journal-box and axle at the inner end of the former, and has attached at the center of its arch a hinged cover, *h*, for the oil-cup, which cover is hollowed to contain packing when necessary.

K is a clip similar to the clip E, but surrounding the journal-box and axle at the outer end of said box and resting at top upon an inward projection of the fender clamp-plate *k*, the upper edge of which projects outward beyond the end of the axle, and is designed to protect the parts from sand and dirt.

As the outer portion of the spindle and boxing in the hub of the wheel are both angular, the spindle must turn with the wheel, its inner rounded end having a bearing in the adjacent journal-box D. Thus the oil descending from the oil-cup will be automatically distributed over the cylindrical or bearing portion of the spindle, so as to lubricate the same effectually.

By the described construction any wear of the hub is prevented, all the wear being on the cylindrical portions of the spindles and the journal-boxes. The wheels can, moreover, be quickly detached and replaced when desirable or necessary, and the parts are prevented from jamming each other when in place.

Having described my invention, I claim—

1. The combination, with the axle, the journal-boxes, and the clips E K, of the cover *h*, hinged to the clip E, and the fender-plate *k*, having the inward projection engaging the clip K, substantially as specified.

2. The combination, with the axle composed of the central wooden piece and the metal strips C C, secured to the sides of said central piece and provided with the retaining-lugs c c, of the journal-boxes secured between the ends of said metal strips, the oil-cups made in the tops of said journal-boxes, and the spindles rotating in the journal-boxes and having the wheels attached to and rotating with their outer ends, substantially as specified.

3. The combination, with the axle A, composed of the center piece, B, and metal strips C C, provided with the lugs c, of the journal-boxes D, the oil-cups H, made in said boxes, the clips to secure the center piece and strips C C together, the fender clamp-plates, the spindles F, turning in the journal-boxes, the boxing G, secured to the hubs of the wheels and fitting on the squared part of the spindles, and the nuts on the tapped inner and outer ends of the spindles, substantially as specified.

In testimony whereof I affix my signature in presence of two witnesses.

JOHN F. DIXON.

Witnesses:
A. M. STORY,
A. A. GODARD.